United States Patent
Watanabe et al.

(10) Patent No.: US 8,184,586 B2
(45) Date of Patent: May 22, 2012

(54) RADIO BASE STATION AND RADIO RESOURCE ALLOCATION METHOD AND RADIO COMMUNICATION SYSTEM

(75) Inventors: Masahiro Watanabe, Kawasaki (JP); Yuuta Nakaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 330 days.

(21) Appl. No.: 12/648,570

(22) Filed: Dec. 29, 2009

(65) Prior Publication Data

US 2010/0177732 A1 Jul. 15, 2010

(30) Foreign Application Priority Data

Jan. 15, 2009 (JP) .................................. 2009-006966

(51) Int. Cl.
*H04W 4/00* (2009.01)
(52) U.S. Cl. ........ 370/330; 370/203; 370/210; 370/437; 370/478; 455/452.1
(58) Field of Classification Search .................. None
See application file for complete search history.

(56) References Cited

U.S. PATENT DOCUMENTS

| 6,335,923 | B2 | 1/2002 | Kubo et al. |
| 2002/0147017 | A1 | 10/2002 | Li et al. |
| 2007/0121538 | A1 | 5/2007 | Ode et al. |
| 2007/0177494 | A1 | 8/2007 | Tomizawa |
| 2007/0201398 | A1 | 8/2007 | Yang et al. |
| 2009/0175226 | A1* | 7/2009 | Ren et al. ............ 370/329 |
| 2010/0056165 | A1* | 3/2010 | Kim et al. ............ 455/450 |

FOREIGN PATENT DOCUMENTS

| EP | 1 793 521 | 6/2007 |
| JP | 10-79701 | 3/1998 |
| JP | 2007-150971 | 6/2007 |

OTHER PUBLICATIONS

Extended European Search Report "Communication" for corresponding European Patent Application No. 10150618.6, dated Jul. 6, 2010.

* cited by examiner

*Primary Examiner* — Bob Phunkulh
(74) *Attorney, Agent, or Firm* — Myers Wolin, LLC

(57) ABSTRACT

A base station, for allocating to a mobile station a radio resource in a time direction and a frequency direction of a frame to perform radio communications with the mobile station, includes a zone forming unit configured to apply to zones, into which the frame is partitioned in the time direction, one of pilot transmission methods different in terms of a pilot allocation or a pilot directivity and in an allocation of transmission data to a plurality of mobile stations in a first zone adjacent to a second zone with a pilot transmission method different from the pilot transmission method of the first zone applied to the second zone, a scheduler configured to schedule a first mobile station moving at a low speed to a vicinity of a boundary with the second zone at a higher priority than a second mobile station moving at a high speed.

14 Claims, 16 Drawing Sheets

US 8,184,586 B2

RADIO BASE STATION AND RADIO RESOURCE ALLOCATION METHOD AND RADIO COMMUNICATION SYSTEM

CROSS-REFERENCE TO RELATED APPLICATIONS

This application is based upon and claims the benefits of priority of prior Japanese Patent Application No. 2009-6966, filed on Jan. 15, 2009, the entire contents of which are incorporated herein by reference.

FIELD

Certain aspects of the present invention discussed herein are related to a radio resource allocation technique used for mobile radio communication.

BACKGROUND

The Orthogonal Frequency Division Multiple Access (OFDMA) communication method is adopted in mobile WiMAX as one of the standards for next-generation high-speed data communications or in the downlink of Long Term Evolution (LTE). In OFDMA, radio resources are two-dimensionally allocated, in a time direction (symbol direction) and a frequency direction (subcarrier direction). In the OFDMA communication method, a frame is segmented into a plurality of zones in the time direction, and different subcarriers are arranged for the zones (in distributed subcarrier allocation or adjacent subcarrier allocation).

A structure of such a frame is illustrated in FIG. 12. A downlink subframe of the frame illustrated in FIG. 12 includes a preamble signal, a zone Z1 with a distributed subcarrier applied thereto, a zone Z2 with an adjacent subcarrier applied thereto, and a zone Z3 with an adjacent subcarrier applied thereto. A transmit transition gap (TTG) is a guard period within which a radio base station (hereinafter simply referred to as base station) switches from transmission to reception, and a receive transition gap (RTG) is a guard period within which the base station switches from reception to transmission.

Zone switching is performed in order to selectively use broadcast communication to all users or communication for controlling transmission in directivity to a particular user. As illustrated in FIG. 12, the broadcast communication is allocated to the zones Z1 and Z2, and the communication for the particular user is allocated to the zone Z3.

In addition to user data (user symbol), a reference signal, such as a pilot signal (pilot symbol), is exchanged between a base station and a mobile station in order to estimate a channel. Different pilot allocations (pilot subcarrier allocations) are used for respective subcarrier allocations so that a channel estimation accuracy and a band usage efficiency are increased.

FIGS. 13 and 14 illustrate different pilot allocations. A pilot allocation PC1 illustrated in FIG. 13 is used for distributed subcarrier allocation, and a pilot allocation PC2 illustrated in FIG. 14 is used for an adjacent subcarrier allocation. As illustrated in FIG. 13, odd symbols and even symbols of the pilot symbols are arranged in a shift of several subcarriers in the pilot allocation PC1. As illustrated in FIG. 14, the pilot symbols are allocated to particular subcarriers in the pilot allocation PC2.

The mobile station receiving the frame compares a pilot symbol received from the base station with a known pilot symbol, thereby calculating an estimated value of a channel from the base station to the mobile station (downlink). A channel estimated value related to a symbol with no pilot symbol allocation (for example, a data symbol) is determined by linearly interpolating in a time direction and/or a frequency direction the channel estimated values, calculated based on the pilot symbol.

As illustrated in FIG. 13, the channel estimated value at data symbol D22 is determined as the mean value of the channel estimated values of pilot symbols P11 and P31. The channel estimated value of data symbol D21 is calculated as a linear interpolation value between the channel estimated values of a pilot symbol P21 and the data symbol D22.

Referring to FIG. 14, the channel estimated value at a data symbol D61 is calculated as a linear interpolation value of the channel estimated values at pilot symbols P61 and P62. A calculation accuracy of the interpolation value is increased by using pilot symbols P51, P52, P71, and P72 consecutive in the time direction.

Generally, the channel estimated accuracy (accuracy of the interpolation) is increased by inserting a large number of pilot symbols in the frame. However, the number of data symbols inserted is accordingly reduced, and data transmission efficiency (throughput) is thus reduced. Increasing the data transmission efficiency limits the number of pilot symbols that can be inserted into the frame in accordance with the pilot allocation.

Japanese Laid Open Patent Publication 2007-150971 discloses a radio communication method that allows the number of pilots to be variable within a frame addressed to a mobile station in response to reception quality.

A zone boundary between adjacent zones where different pilot allocations are applied in a frame is now considered. In such a zone boundary, positional continuity is lost in the time direction with the pilots allocated, as illustrated in FIG. 15, and the accuracy level of the channel estimation may be lowered. In particular, if there is a large variation in a propagation channel, a decrease in the channel estimation accuracy becomes pronounced.

The adjacent zones may have the same pilot allocation, but may be different in pilot directivity. In such a case, neither an interpolation operation nor averaging operation can be performed in the time direction using the pilots of the adjacent zones in the vicinity of the boundary of a schedule target zone. Thus, the channel estimation accuracy is lowered. In one case of different directivities of the pilots, a downlink communication is performed in a beam forming operation to a particular mobile station allocated to a schedule target zone. In such a case, the propagation channel is different from that for broadcast communication. Thus, even if the adjacent zones have the same pilot allocation, neither an interpolation operation nor averaging operation can be performed in the time direction using the pilots of the adjacent zones in the vicinity of the boundary of the schedule target zone.

An edge region close to the edge of a zone in the frequency direction is considered (see FIG. 16). Continuity of the positions of the pilots is naturally lost in the frequency direction in the edge area. Thus; the channel estimation accuracy may be lowered. In particular, if there is a large variation in a propagation channel in the frequency direction, the decrease in the channel estimation accuracy becomes pronounced. The decrease is particularly pronounced if the adjacent subcarrier allocation, which is not expected to provide frequency diversity advantage, is applied.

SUMMARY

According to a certain aspect of the invention, a radio base station for allocating to a mobile station a radio resource in a time direction and a frequency direction of a frame to perform radio communications with the mobile station, includes a zone forming unit for applying to a plurality of zones, into which the frame is partitioned in the time direction, one of pilot transmission methods different in terms of a pilot allocation or a pilot directivity, and in the allocation of transmission data to a plurality of mobile stations in a first zone adjacent to a second zone with a pilot transmission method different from the pilot transmission method of the first zone applied to the second zone, a scheduler for scheduling a first mobile station moving at a low speed from among the plurality of mobile stations to a vicinity of a boundary with the second zone at a higher priority than a second mobile station moving at a high speed.

According to a certain aspect of the invention, a radio base station for allocating to a mobile station a radio resource in a time direction and a frequency direction of a frame to perform radio communications with the mobile station, includes a zone forming unit for applying to a plurality of zones, into which the frame is partitioned in the time direction, one of pilot transmission methods different in terms of a pilot allocation or a pilot directivity, an estimating unit for estimating a variation value of a propagation channel in the frequency direction for each of a plurality of mobile stations, and in the allocation of a band to the plurality of mobile stations in a first zone, a scheduler for scheduling a first mobile station to an edge part of the frame in the frequency direction at a higher priority than a second mobile station, the second mobile station from among the plurality of mobile stations being higher in variation value in the propagation channel than the first mobile station.

It is to be understood that both the foregoing general description and the following detailed description are exemplary and explanatory and are not restrictive of the invention, as claimed.

DESCRIPTION OF EMBODIMENTS

Exemplary embodiments for carrying out present invention are described with reference to the figures.

1. First Embodiment

A radio communication system of a first embodiment is described below.

1-1 Structure of Radio Communication System

Figure 1:
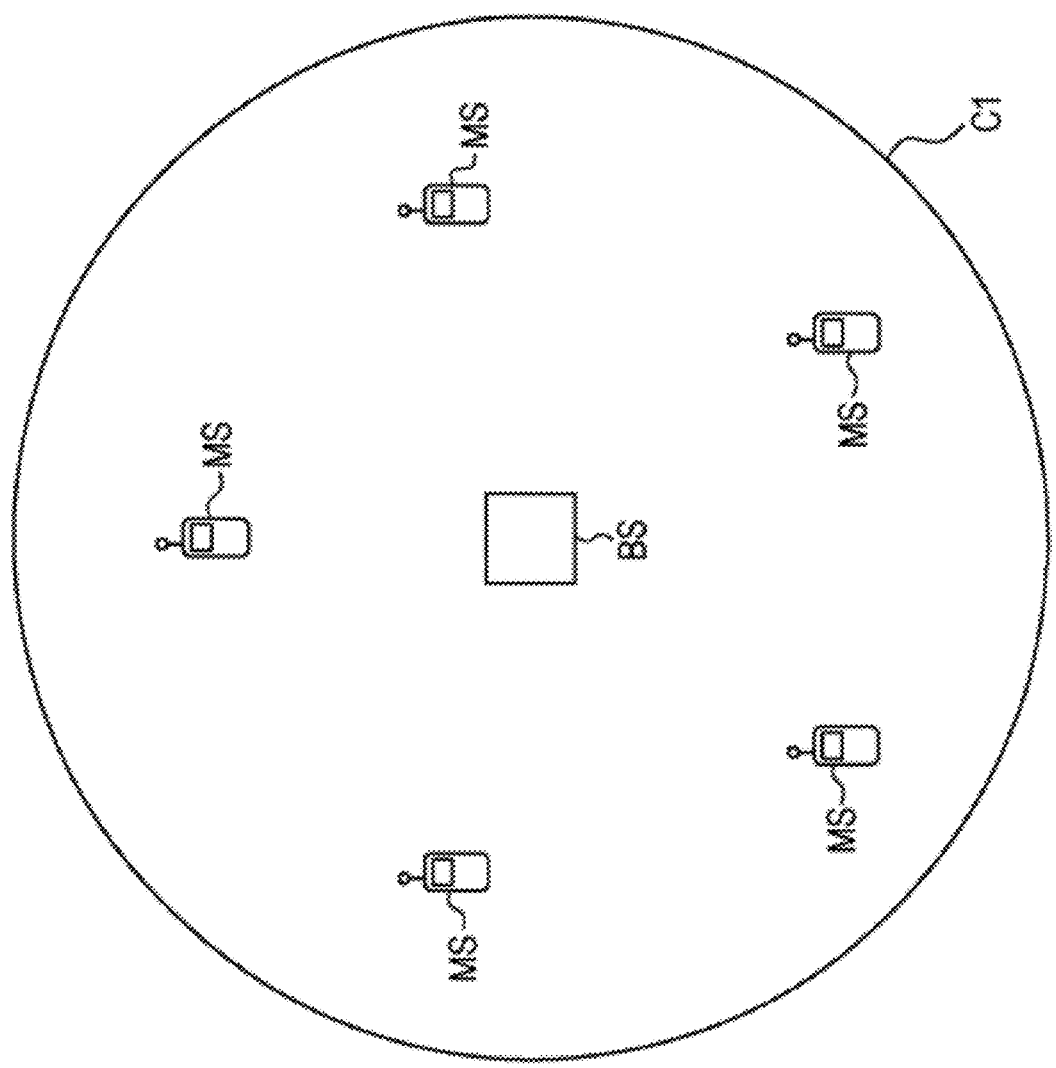
FIG. 1 illustrates an example of a system configuration of radio communication system according to an embodiment.

FIG. 1 illustrates a system structure of a radio communication system of a first embodiment. In the radio communication system, a base station BS radio communicates with a plurality of mobile stations MS within a service area (cell C1). A multi-carrier communication method such as OFDMA communication method may be used in the radio communication. Radio resources are allocated (scheduled) two-dimensionally in a time direction and a frequency direction in the radio communication.

1-2 Frame Structure

In the OFDMA communication method, a frame is partitioned into a plurality of zones in the time direction depending on transmission environment and the purpose of the communication, and different subcarrier allocations (including a distributed subcarrier allocation and an adjacent (consecutive) subcarrier allocation) are applied to the zones. Different pilot allocations (different pilot subcarrier allocation method) are applied as the subcarrier allocations. This may advantageously increase channel estimation accuracy and a band usage efficiency.

1-3 Scheduling Method

Figure 2:
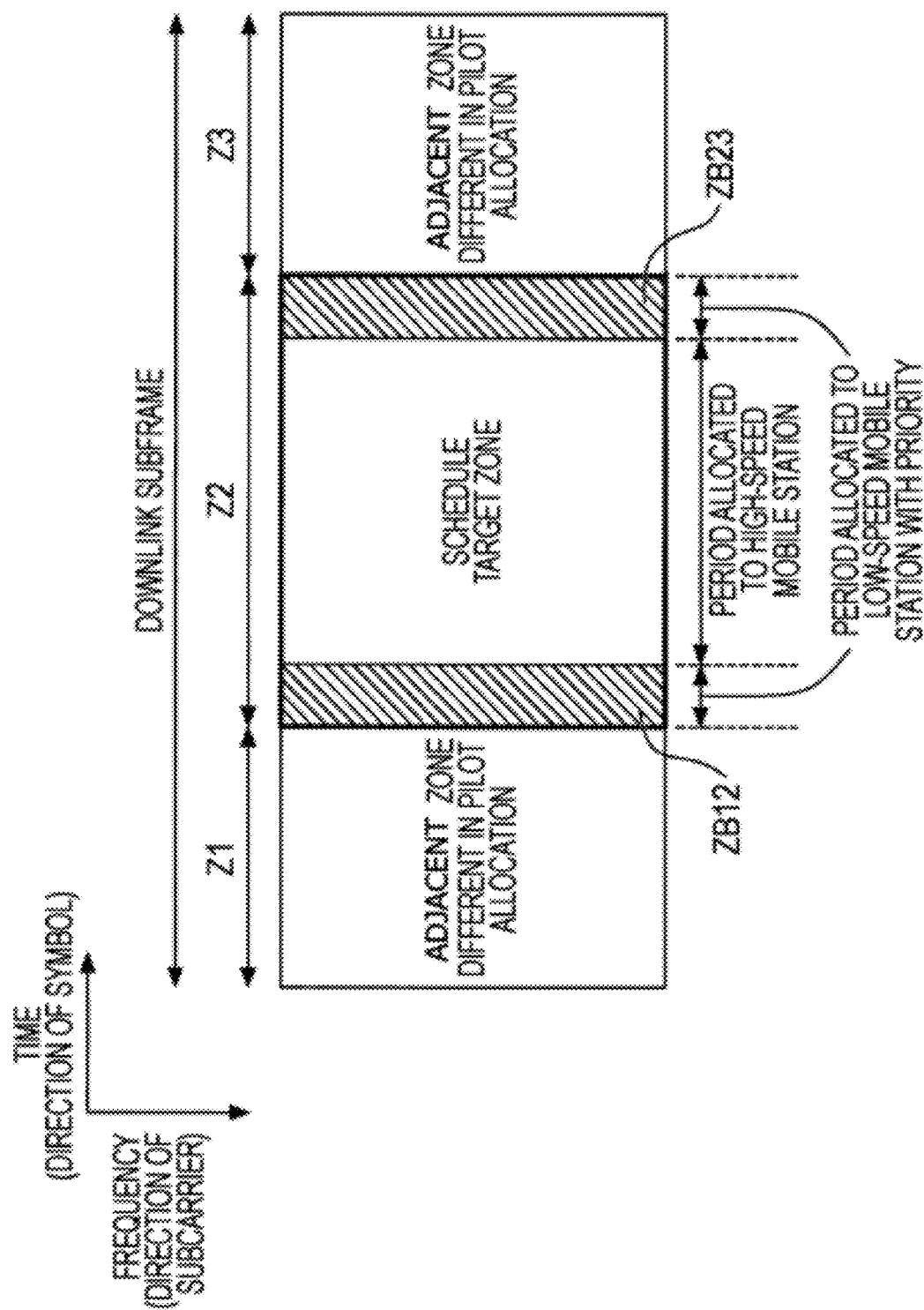
FIG. 2 illustrates an example of a scheduling method for radio resources according to an embodiment.
Figure 3:
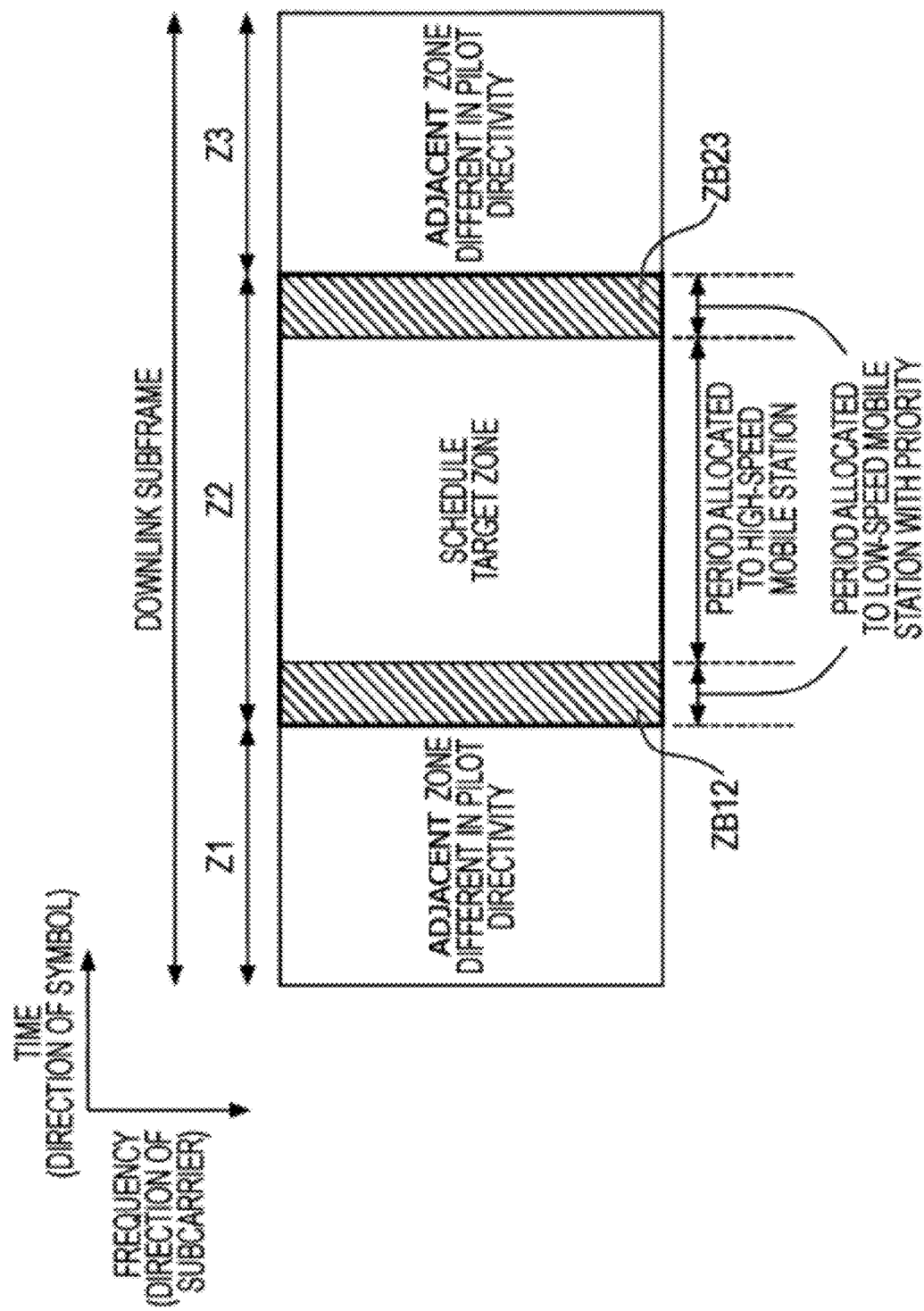
FIG. 3 illustrates an example of a scheduling method for radio resources according to an embodiment.

A scheduling method of the radio resources to a given zone of a frame in the radio communication system is described below with reference to FIGS. 2 and 3. FIG. 2 illustrates a scheduling method (pilot transmission method) performed when a schedule target zone is adjacent to a zone having a different pilot allocation. FIG. 3 illustrates a scheduling method (pilot transmission method) performed when a schedule target zone is adjacent to a zone having a different pilot directivity. A downlink subframe excluding a preamble signal is illustrated in FIGS. 2 and 3.

(1) Zone Adjacent to Zone Having a Different Pilot Allocation

As illustrated in FIG. 2, a zone (resource) Z2 is a schedule target zone. In the radio communication system, areas (resource) (ZB12 and ZB23) within the zone Z2 are in the vicinity of boundaries with adjacent zones (resources) (Z1 and Z3), and a mobile station moving at a low speed (hereinafter referred to as a low-speed mobile station) from among a plurality of mobile stations is scheduled at a higher priority to the areas (ZB12 and ZB23) of the zone Z2 adjacent to the adjacent zones Z1 and Z3. A mobile station moving at a high speed (hereinafter referred to as a high-speed mobile station) from among the plurality of mobile stations is scheduled to an area excluding the areas (resources) (ZB12 and ZB23) of the zone Z2 adjacent to the adjacent zones Z1 and Z3.

A variation with time in the propagation channel is smaller in communications between the base station and the low-speed mobile station than in communications between the base station and the high-speed mobile station. Thus, even if the low-speed mobile station is scheduled to the area in the vicinity of the zone boundary that is subject to a degradation in accuracy in an interpolation operation and an averaging operation in the time direction, a decrease in channel estimation accuracy may still be small. On the other hand, the communications between the base station and the high-speed mobile station are subject to large time variations in the propagation channel. Since the high-speed mobile station is scheduled to the area other than the vicinity of the zone boundary, the accuracy may be maintained in the interpolation operation and the averaging operation in the time direction and a decrease in the channel estimation accuracy may still be small. By applying the scheduling method illustrated in FIG. 2, the communication throughput of the plurality of mobile stations scheduled to all the zones may be increased.

(2) Zone Adjacent to Zone Having Different Pilot Directivity

A schedule target zone may be adjacent to a zone having a different pilot directivity as illustrated in FIG. 3. The same scheduling as described with reference to FIG. 2 is also performed. In the radio communication system with a zone (resource) Z2 being the schedule target zone, the areas (resources) (ZB12 and ZB23) within the zone Z2 are in the vicinity of boundaries with adjacent zones (resources) (Z1 and Z3), and a mobile station moving at a low speed from among a plurality of mobile stations is scheduled at a higher priority to the areas (resources) (ZB12 and ZB23) of the zone Z2 adjacent to the zones Z1 and Z3. A mobile station moving at a high speed may be scheduled to an area excluding (or low priority) the areas (ZB12 and ZB23) of the zone Z2 adjacent to the zones Z1 and Z3.

Generally, if the adjacent zones are the same in pilot allocation but different in pilot directivity, the interpolation operation and the averaging operation in the time direction in an area in the vicinity of a boundary of a schedule target zone may not be performed using a pilot of an adjacent zone. The channel estimation accuracy is likely to be reduced. In one example where the pilot directivities are different, a downlink communication is performed through a beam forming operation on a particular mobile station allocated to within a schedule target zone. In such a case, the propagation channel is different from that of broadcast communications. Even if the adjacent zones have the same pilot allocation, the interpolation operation and the averaging operation may not be performed in the time direction using the pilot on the other adjacent zone.

The variation with time in the propagation channel is smaller in communications between the base station and the low-speed mobile station than in communications between the base station and the high-speed mobile station. In accordance with the scheduling method illustrated in FIG. 3, even if the low-speed mobile station is scheduled to the area in the vicinity of the zone boundary that is subject to a decrease in accuracy in an interpolation operation and an averaging operation in the time direction, a decrease in the channel estimation accuracy may still be small. On the other hand, the communications between the base station and the high-speed mobile station are subject to large variations with time in the propagation channel. Since the high-speed mobile station is scheduled to the area other than the vicinity of the zone boundary, the accuracy is maintained in the interpolation operation and the averaging operation in the time direction and the decrease in the channel estimation accuracy may still be small. By applying the scheduling method illustrated in FIG. 3, the communication throughput of the plurality of mobile stations scheduled to all the zones may thus be increased.

1-4 Structure of the Base Station and the Mobile Station

An example of structure of the base station and the mobile station to perform the above-described scheduling method is described below.

Figure 4:
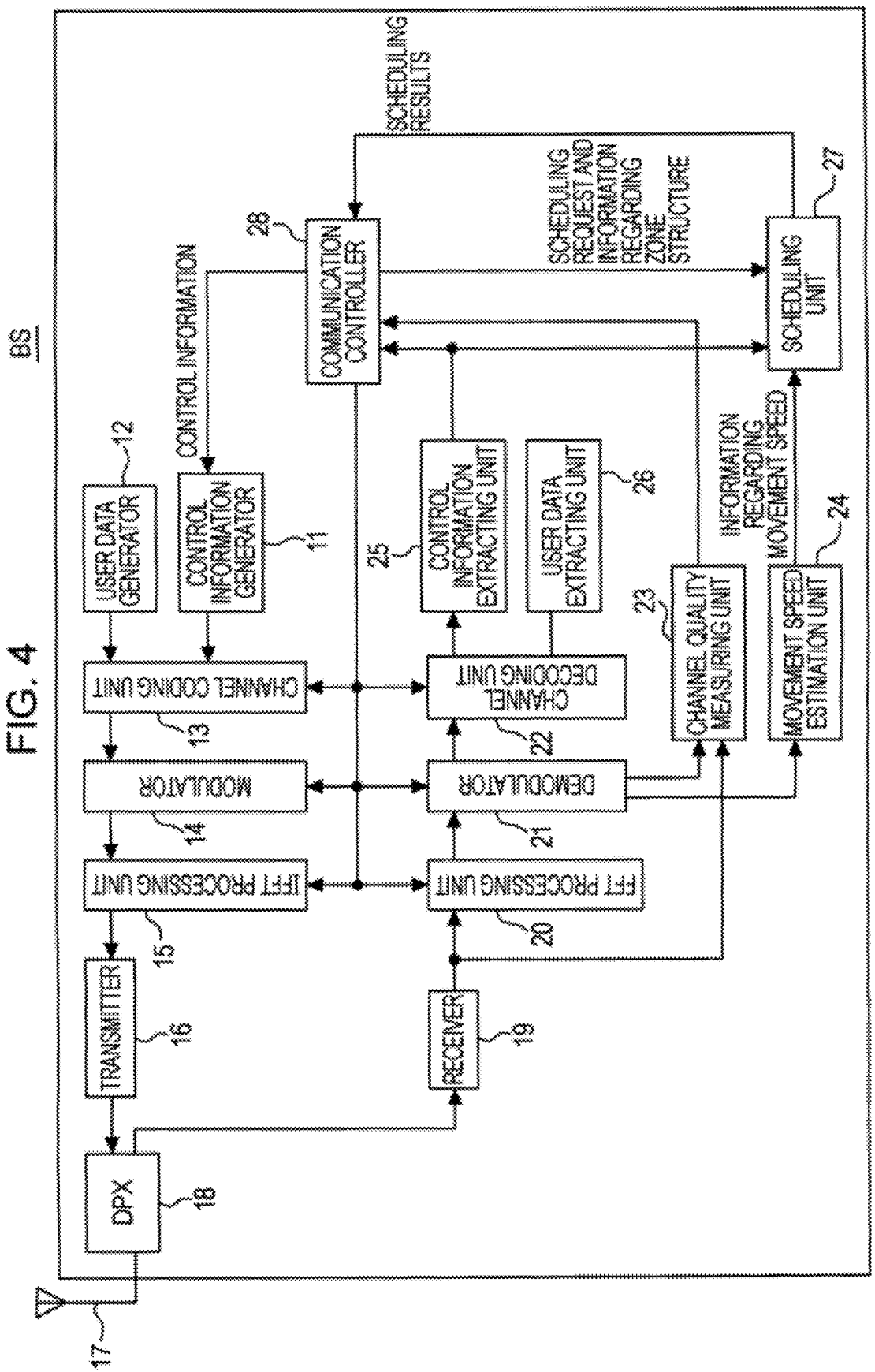
FIG. 4 illustrates an example of a structure of a base station according an embodiment.
Figure 5:
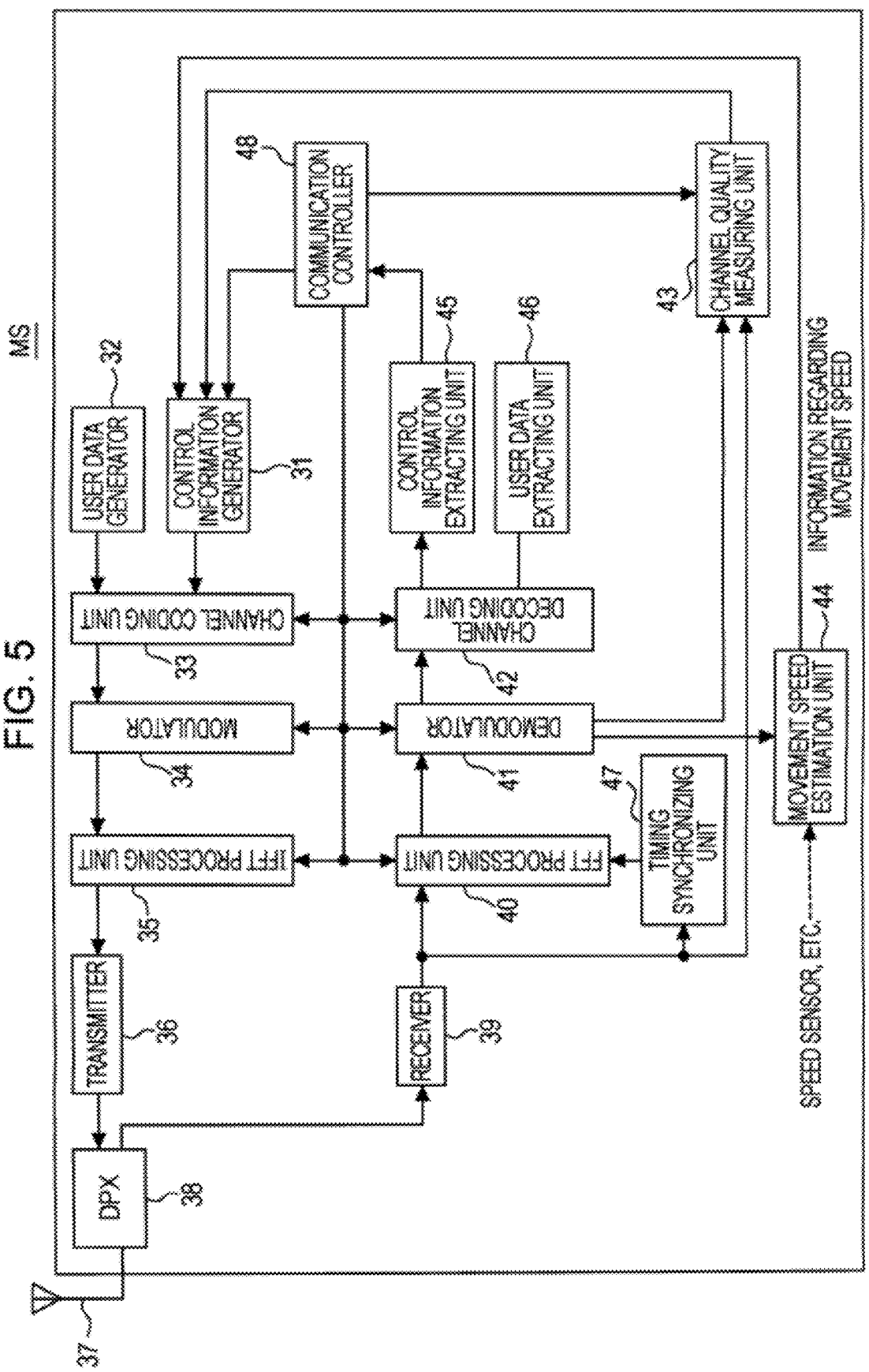
FIG. 5 illustrates an example of a structure of a mobile station according to an embodiment.

The structure of the base station and the mobile station in the radio communication system of the embodiment is described with reference to FIGS. 4 and 5. FIG. 4 is a block diagram illustrating a major portion of the internal structure of the base station (BS). FIG. 5 is a block diagram illustrating a major portion of the internal structure of the mobile station (MS).

Structure of the Base Station

Referring to FIG. 4, the base station includes control information generator 11, user data generator 12, channel coding unit 13, modulator 14, IFFT processing unit 15, transmitter 16, antenna 17, duplexer (DPX) 18, receiver 19, FFT processing unit 20, demodulator 21, channel decoding unit 22, channel quality measuring unit 23, movement speed estimation unit 24, control information extracting unit 25, user data extracting unit 26, scheduling unit 27, and communication controller (zone forming unit) 28. The duplexer 18 is used to allow a transmitting section and a receiving section to share the antenna 17.

The channel coding unit 13 multiplexes user data from the user data generator 12 and control information from the control information generator 11, and also performs an error correction encoding operation, an interleave operation, etc.

The modulator 14 performs a bit iteration operation on data encoded by the channel coding unit 13, and an insertion operation of a pilot signal and a preamble signal while also performing a predetermined modulation operation. The user data is modulated using a modulation method with a predetermined multivalued modulation (such as quadrature phase shift keying (QPSK), 16 quadrature amplitude modulation (QAM), or 64 QAM). The control signal requiring high-quality transmission is modulated at a low encoding rate using the binary phase shift keying (BPSK) or QPSK.

In response to an instruction from the communication controller 28, the modulator 14 allocates a data symbol and a pilot symbol obtained through the modulation to each OFDM symbol of each subcarrier as in the scheduling results stored on the communication controller 28.

The IFFT (inverse fast Fourier transform) processing unit 15 inverse fast Fourier transforms the output from the modulator 14 into a waveform in the time domain, thereby outputting the transformed signal to the transmitter 16.

The transmitter 16 includes a digital-to-analog (D/A) converter, a local frequency oscillator, a mixer, a power amplifier, a filter, etc. The transmitter 16 up-converts the transmission data from the IFFT processing unit 15 from a baseband frequency to a radio frequency and then transmits the transmission data as a radio frequency signal into space from the antenna 17.

The receiver 19 includes a band-limiting filter, a low-noise amplifier (LNA), a local frequency oscillator, an orthogonal demodulator, an automatic gain control (AGC) amplifier, an analog-to-digital (A/D) converter, etc. The receiver 19 converts the received radio frequency signal into a digital baseband signal.

The FFT processing unit 20 sets an FFT window at a timing specified by the communication controller 28, and performs an FFT operation by sampling the input digital data, thus resulting in an encoded symbol string of each subcarrier.

The demodulator 21 performs a channel estimation process based on a pilot symbol inserted into a predetermined subcarrier. In the channel estimation process, the pilot symbol resulting from the received signal is compared with an existing pilot symbol, and a channel estimation value of an uplink from the mobile station to the base station is obtained. A channel estimation value related to a symbol with no pilot symbol allocated thereto (i.e., data symbol) is calculated by linearly interpolating in the time direction and/or the frequency direction the channel estimation values calculated, based on the pilot symbol.

The demodulator 21 generates an encoding symbol string through a demodulation process.

The channel decoding unit 22 performs a decoding process and a deinterleave process, corresponding to the error correction encoding process performed at the mobile station, thereby extracting a received data string (sequence).

The channel quality measuring unit 23 extracts, from the encoded data string from the demodulator 21, known reference signals, including the pilot symbol and the preamble signal. The channel quality measuring unit 23 measures the reception quality of each subcarrier based on the reference signals. For example, known reception quality values, such as a carrier to interferer plus noise ratio (CINR) and a received signal strength indicator (RSSI), are measured.

The movement speed estimation unit 24 extracts, from the encoded data string from the demodulator 21, known reference signals including the pilot symbol and the preamble signal, and then estimates the movement speed of the mobile station by measuring a fading pitch of an electric field intensity of the reference signal. A specific method of measuring the movement speed is known (as disclosed in Japanese Laid Open Patent Publication No. 10-79701 (U.S. Pat. No. 6,335, 923)), and the detailed discussion of the method is omitted here.

If a mobile station detects its own movement speed and then successively notifies the base station of the detected movement speed, the movement speed estimation unit 24 may be omitted.

The control information extracting unit 25 extracts the control information from the received data string output from the channel decoding unit 22, and outputs the control information to the communication controller 28. The user data extracting unit 26 extracts user data from the received data string output from the channel decoding unit 22.

The communication controller 28 controls each element within the base station in response to an instruction from an upper layer apparatus (not shown) and the control information from the control information extracting unit 25. The communication controller (zone forming unit) 28 also provides information related to the zone configuration of a transmission frame (including allocation of a plurality of zones, subcarrier allocation of each zone, and the pilot directivity of each zone), and requests the scheduling unit 27 to perform the scheduling process.

The scheduling unit 27 schedules the radio resources to each mobile station two-dimensionally, in the time direction and the frequency direction of the frame, based on, in part, the movement information of each mobile station obtained by the movement speed estimation unit 24 and the information of the zone configuration obtained by the communication controller 28.

Structure of the Mobile Station

As illustrated in FIG. 5, the mobile station includes control information generator 31, user data generator 32, channel coding unit 33, modulator 34, IFFT processing unit 35, transmitter 36, antenna 37, duplexer (DPX) 38, receiver 39, FFT processing unit 40, demodulator 41, channel decoding unit 42, channel quality measuring unit 43, movement speed estimation unit 44, control information extracting unit 45, user data extracting unit 46, timing synchronizing unit 47, and communication controller 48. The duplexer 38 is used to allow a transmitting section and a receiving section to share the antenna 37.

The channel coding unit 33 multiplexes user data from the user data generator 32 and control information from the control information generator 31, and also performs an error correction encoding operation, an interleave operation, etc. The control information generated by the control information generator 31 contains information related to the movement speed of the mobile station.

The modulator 34 performs a bit iteration operation on data encoded by the channel coding unit 33, and an insertion operation of a pilot signal and a preamble signal while also performing a predetermined modulation operation. The user data is modulated using a modulation method with a predetermined multivalued modulation (such as QPSK, 16 QAM, or 64 QAM). The control signal requiring high-quality transmission is modulated at a low encoding rate using BPSK or QPSK.

In response to an instruction from the communication controller 48, the modulator 34 allocates a data symbol and a pilot symbol obtained through modulation to each OFDM symbol of each subcarrier.

The IFFT (inverse fast Fourier transform) processing unit 35 inverse fast Fourier transforms the output from the modulator 34 into a waveform in the time domain, thereby outputting the transformed signal to the transmitter 36.

The transmitter 36 includes a digital-to-analog (D/A) converter, a local frequency oscillator, a mixer, a power amplifier, a filter, etc. The transmitter 16 up-converts the transmission data from the IFFT processing unit 35 from a baseband frequency to a radio frequency and then transmits the transmission data as a radio frequency signal into space from the antenna 37.

The receiver 39 includes a band-limiting filter, a low-noise amplifier (LNA), a local frequency oscillator, an orthogonal demodulator, an automatic gain control (AGC) amplifier, an analog-to-digital (A/D) converter, etc. The receiver 39 converts the received radio frequency signal into a digital baseband signal.

The FFT processing unit 40 sets an FFT window at a timing specified by the communication controller 48, and performs an FFT operation by sampling the input digital data, resulting in an encoded symbol string of each subcarrier.

The demodulator 41 performs a channel estimation process based on a pilot symbol inserted into a predetermined subcarrier. In the channel estimation process, the pilot symbol, resulting from the received signal, is compared with an existing pilot symbol, and a channel estimation value of a downlink from the base station to the mobile station is thus obtained. A channel estimation value, related to a symbol with no pilot symbol allocated thereto (i.e., data symbol), is calculated by linearly interpolating in the time direction and/or the frequency direction the channel estimation values calculated based on the pilot symbols.

The demodulator 41 generates an encoding symbol string through a demodulation process.

The channel decoding unit 42 performs a decoding process and a deinterleave process, corresponding to the error correction encoding process performed at the base station, thereby extracting a received data string.

The channel quality measuring unit 43 extracts, from the encoded data string from the demodulator 41, known reference signals, including the pilot symbol and the preamble signal. The channel quality measuring unit 43 measures a reception quality of each subcarrier based on the reference signals. For example, known reception quality values, such as CINR and RSSI, are measured.

The movement speed estimation unit 44 detects the movement speed of the mobile station in response to a signal from a speed sensor or the like (not shown), and successively outputs the detected data to the control information generator 31. If the mobile station is installed on board a vehicle, no speed sensor may be arranged and the movement speed of the mobile station may be received from another on-board device.

If the base station estimates the movement speed of the mobile station in response to the reference signal from the mobile station, it is not necessary to install the movement speed estimation unit 44 on the mobile station.

The control information extracting unit 45 extracts the control information from the received data string output from the channel decoding unit 42, and then outputs the control information to the communication controller 48. The user data extracting unit 46 extracts the user data from the received data string output from the channel decoding unit 42.

The communication controller 48 controls each element within the mobile station in response to an instruction from an upper layer apparatus (not shown) and the control information from the control information extracting unit 45.

1-5 Operation of the Scheduling Unit

Figure 6:
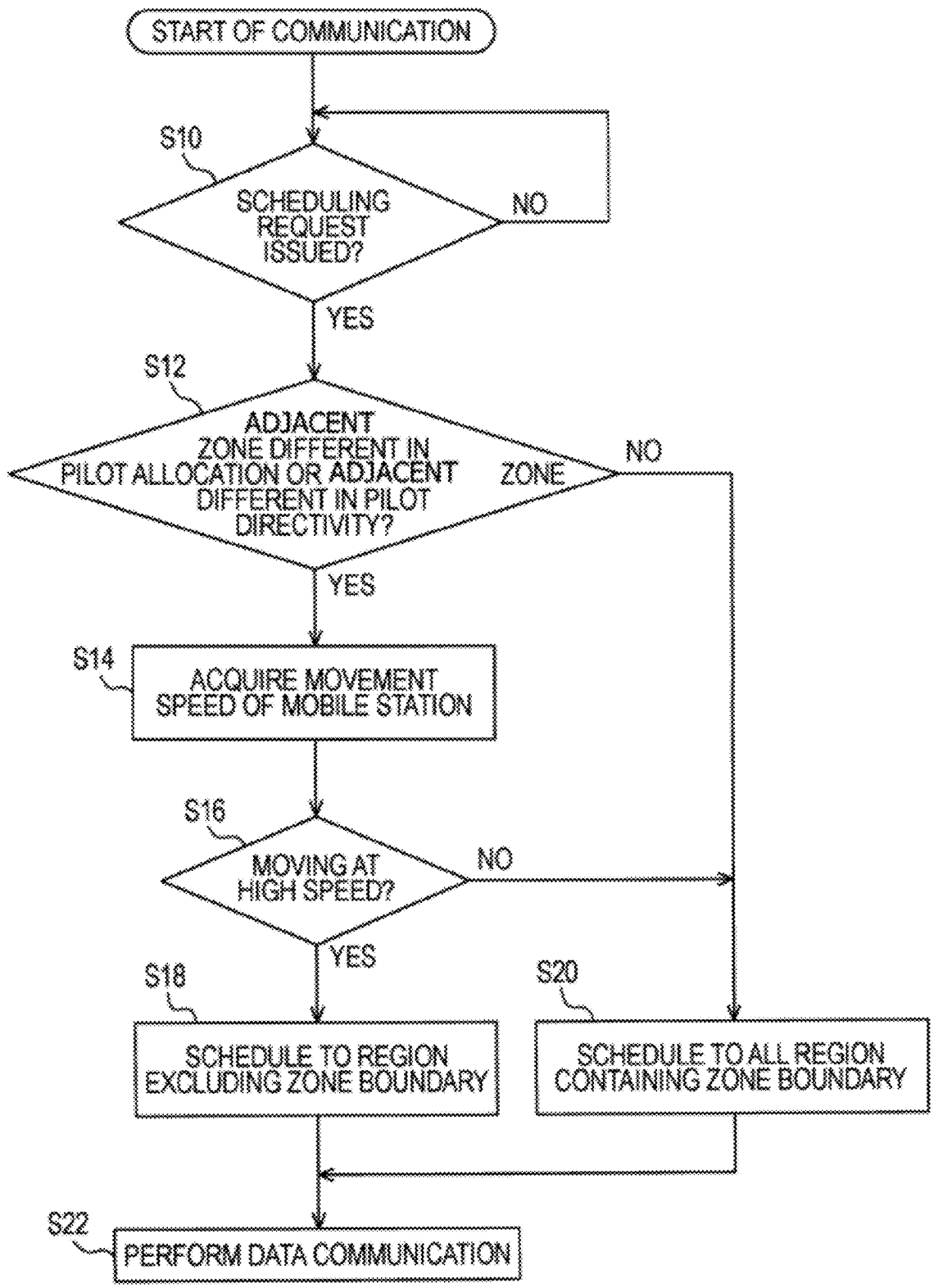
FIG. 6 illustrates an example of a flowchart of an operation conducted by the base station according to an embodiment.

The operation of the scheduling unit 27 on the base station is described below with reference to FIG. 6. FIG. 6 is a flowchart illustrating the operation of the scheduling unit 27 on the base station.

Referring to FIG. 6, the scheduling unit 27 receives from the communication controller 28 the information related to the zone configuration of a transmission frame (including allocation of the plurality of zones, the subcarrier allocation of each zone, and the pilot directivity of each zone) and the schedule request (YES in step S10). The scheduling unit 27 thus starts the scheduling process to each zone. If the zone adjacent to a schedule target zone is different in pilot allocation or in pilot directivity (YES in step S12), the movement speed of the mobile station is acquired (step S14) from the output from the movement speed estimation unit 24, or from the control information from the mobile station.

If the movement speed of the mobile station is higher than a predetermined threshold value, the scheduling unit 27 determines that the mobile station is moving at a high speed (YES in step S16) and then schedules the mobile station to an area excluding the vicinity of a zone boundary (step S18). If the movement speed of the mobile station is lower than the predetermined threshold value, the scheduling unit 27 determines that the mobile station is moving at a low speed (NO in step S16), and schedules the mobile station to all the area containing the vicinity of the zone boundary (step S20). As a result, the low-speed mobile station is scheduled to the vicinity of the zone boundary of the schedule target zone at a higher priority than the high-speed mobile station.

Steps S12-S20 are successively performed on each of the zones. If the scheduling process is complete, the downlink communication is performed based on the scheduling results (step S22).

In accordance with the scheduling method of the radio communication system of the embodiment, the low-speed mobile station with the small variation in the propagation channel in the time direction is scheduled to the vicinity of the zone boundary at a higher priority, and the high-speed mobile station with the large variation in the propagation channel in the time direction is scheduled to the area other than the vicinity of the zone boundary. The high-speed mobile station is thus not scheduled to the vicinity of the zone boundary where the channel estimation accuracy is likely to be decreased in response to a difference in the pilot allocation or the pilot directivity. A decrease in the channel estimation accuracy of the high-speed mobile station may be prevented, and the throughput of the communications with the plurality of mobile stations scheduled to all the zones may be increased.

1-6 Simulation Results

Figure 7:
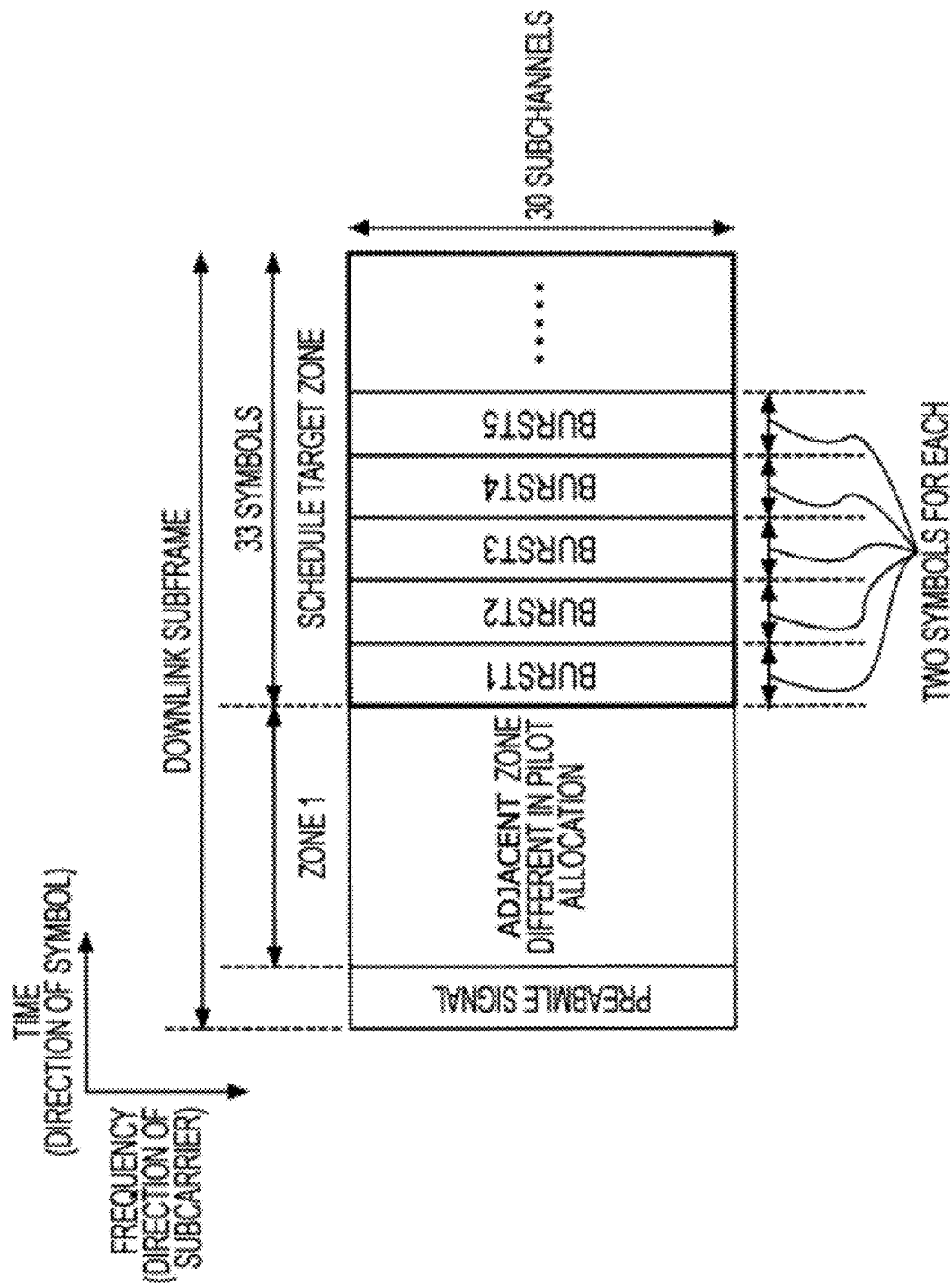
FIG. 7 illustrates an example of a zone structure.

The simulation results on a high-speed mobile station in a radio communication system of an embodiment are described below. FIG. 7 illustrates a zone configuration in the simulation test. The simulation test condition is as follows: the distributed subcarrier allocation is in accordance with the mobile WiMAX standard (PUSC-STC, Matrix B), the modulation and encoding method is 64 QAM (CTC encoding rate 1/2), and the propagation channel environment is vehicular-A (60 km/h) with reception CNR of 30 dB. The simulation results are listed as a bit error rate (BER) subsequent to error correction of each burst in zone in Table 1. The region of burst 1 is a boundary area.

TABLE 1

| Allocation Region | Burst1 | Burst2 | Burst3 | Burst4 | Burst5 |
|---|---|---|---|---|---|
| BER after error correction | $1.28 \times 10^{-2}$ | $2.54 \times 10^{-5}$ | $2.54 \times 10^{-5}$ | $1.41 \times 10^{-5}$ | $3.45 \times 10^{-5}$ |

If a high-speed mobile station is scheduled to a region of Burst 1 at a zone boundary in the modulation method requiring a high channel estimation accuracy, such as 64 QAM, the BER is increased by three orders of magnitude as listed in Table 1. In other words, the simulation results show that scheduling a high-speed mobile station to the area other than the zone boundary achieves a substantial decrease in the BER.

2. Second Embodiment

A radio communication system of a second embodiment is described below.

The radio communication system of the second embodiment is directed to the channel estimation accuracy in the frequency direction. The discussion of the portion of the second embodiment identical to the portion of the first embodiment related to the system structure, and the internal structure of the base station and the mobile station is not repeated here.

2-1 Scheduling Method

Figure 8:
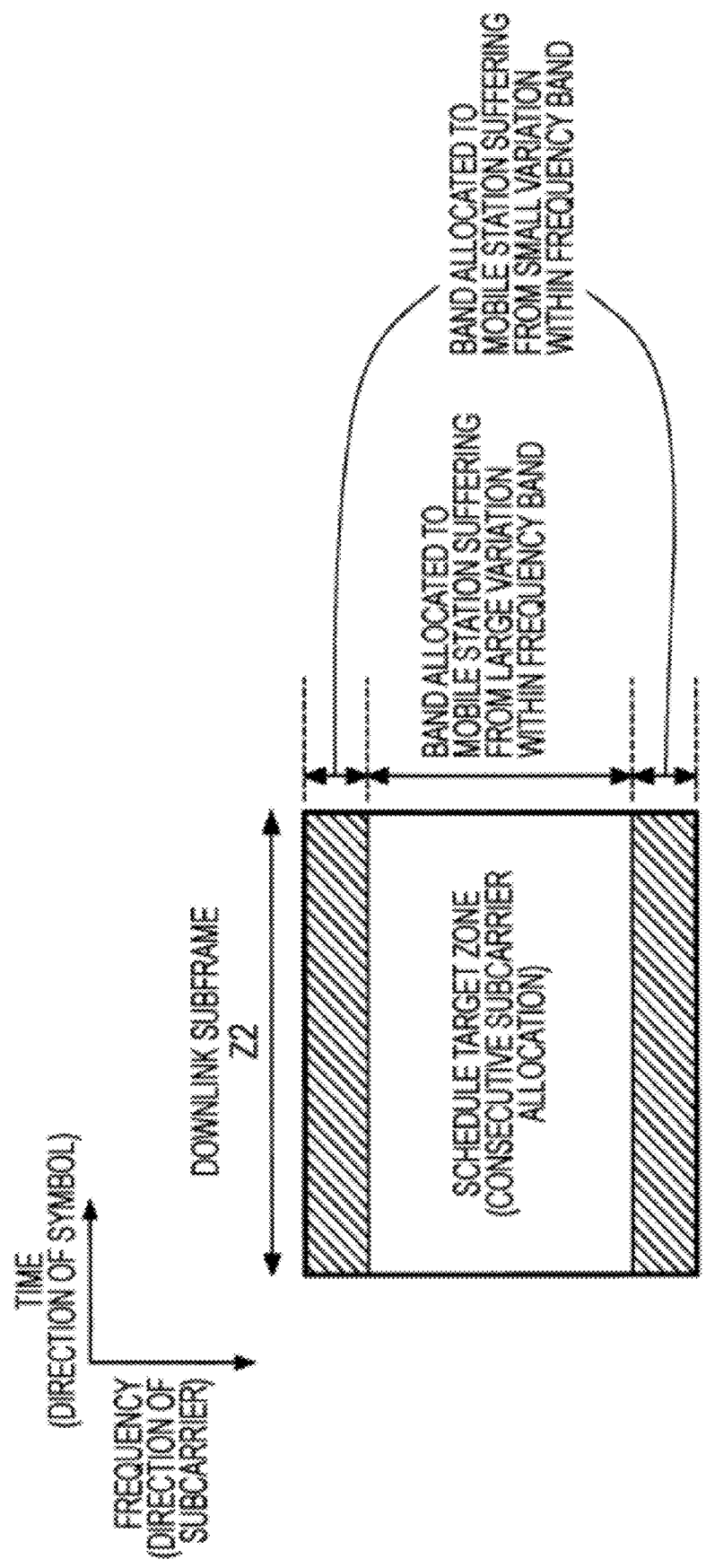
FIG. 8 illustrates an example of a scheduling method according to an embodiment.

A scheduling method of the radio resources to a given zone in the radio communication system is described below with reference to FIG. 8. FIG. 8 illustrates the scheduling method in which the adjacent subcarrier allocation is applied to a schedule target zone. FIG. 8 illustrates only the zone Z2 of the subframe of the downlink illustrated in FIG. 2.

The zone Z2 is a schedule target zone as illustrated in FIG. 8. In the radio communication system, a mobile station with a smaller variation in the propagation channel in the frequency direction is scheduled to an edge part within the zone Z2 in the frequency direction at a higher priority. A mobile station with a larger variation in the propagation channel in the frequency direction from among the mobile stations is scheduled to the region other than the edge part of the zone Z2 in the frequency direction.

Generally, the channel estimation may not be performed using a pilot in a lower frequency band or a pilot in a higher frequency band in the edge part of the zone in the frequency direction (because the pilots for use in the channel estimation are limited). The channel estimation accuracy may be decreased to be lower than in the region other than the edge part. A decrease in the channel estimation accuracy is more pronounced in the adjacent subcarrier allocation than in the distributed subcarrier allocation which is expected to provide the frequency diversity advantage.

In the radio communication system of the second embodiment, a band for a mobile station with a smaller variation in the propagation channel in the frequency direction is scheduled to the edge part of the zone in the frequency direction at a higher priority. A sufficiently high level of the channel estimation accuracy is provided in a mobile station with a smaller variation in the propagation channel in the frequency direction even if the pilots used for the channel estimation are limited.

If a mobile station suffers from a large variation in the propagation channel in the frequency direction, the accuracy of the interpolation operation and the averaging operation in the frequency direction may be maintained by using a number of nearby pilots. The decrease in the channel estimation accuracy remains small. By applying the scheduling method illustrated in FIG. 8, the communication throughput of the plurality of mobile stations scheduled to all the zones may be increased.

2-2 Structure of the Base Station and the Mobile Station

Figure 9:
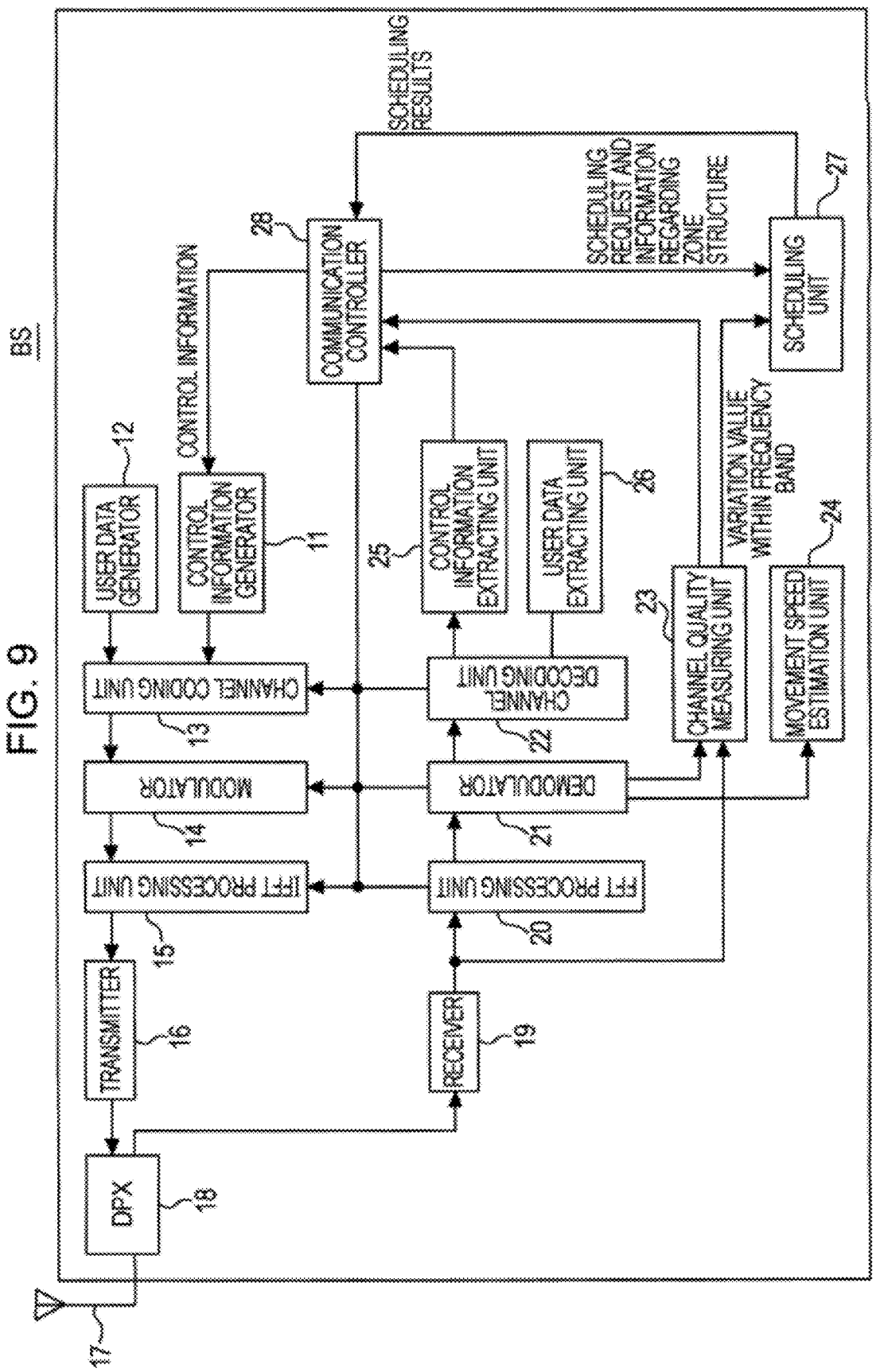
FIG. 9 illustrates an example of a structure of a base station according to an embodiment.

An example of the structure of the base station and the mobile station is described below. The structure of the mobile station remains unchanged from the structure illustrated in FIG. 5. The structure of the base station is illustrated in FIG. 9, and the major portion thereof remains unchanged from the structure illustrated in FIG. 4. Differences from the structure illustrated in FIG. 4 are described below.

Referring to FIG. 9, the channel quality measuring unit (estimating unit) 23 estimates a variation value within the frequency band by detecting a power variation of each pilot signal in the frequency direction in response to the pilot signal of each subcarrier received from the mobile station. The estimation results are supplied to the scheduling unit 27. The variation value within the frequency band can also be calculated by detecting a delay spread of multi-paths in response to a signal in the time domain prior to the FFT process of the FFT processing unit 20.

2-3 Operation of the Scheduling Unit of the Base Station

Figure 10:
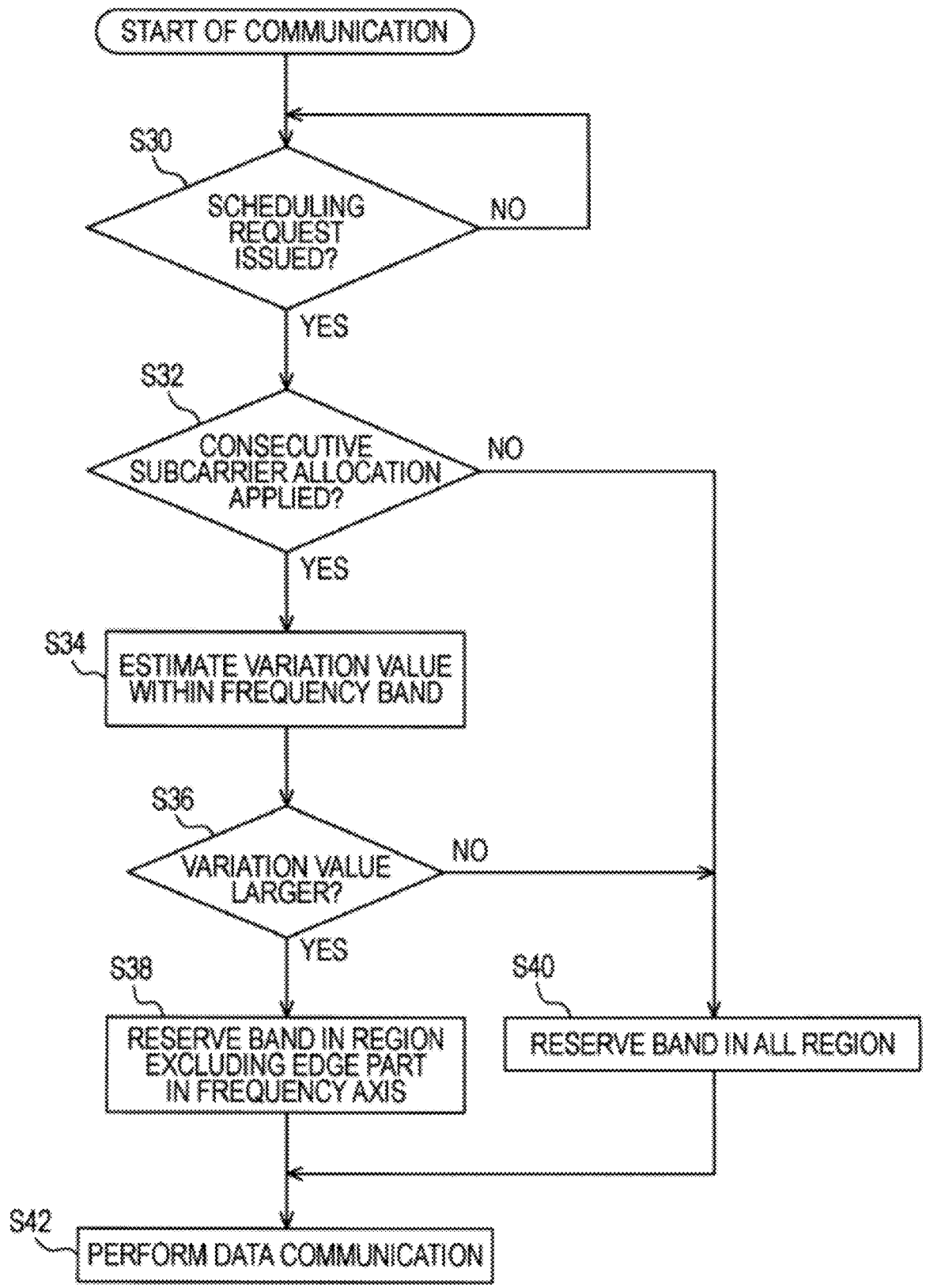
FIG. 10 illustrates an example of a flowchart of an operation conducted by the base station according to an embodiment.

The operation of the scheduling unit 27 in the base station of the embodiment is described with reference to FIG. 10. FIG. 10 is a flowchart of the operation of the scheduling unit 27 in the base station of the second embodiment.

Referring to FIG. 10, the scheduling unit 27 receives from the communication controller 28 the information related to the zone configuration of a transmission frame (including allocation of the plurality of zones, the subcarrier allocation of each zone, the pilot directivity of each zone) and the schedule request (YES in step S30). The scheduling unit 27 thus starts the scheduling process to each zone. If the adjacent subcarrier allocation is applied to the schedule target zone (YES in step S32), the variation value within the frequency band is estimated (step S34). The estimated variation value within the frequency band may be provided by the channel quality measuring unit 23.

If the variation value within the frequency band is higher than a predetermined threshold value (YES in step S36), the scheduling unit 27 reserves the band of the mobile station to the region other than the edge part of the schedule target zone in the frequency direction (step S38). If the variation value within the frequency band is lower than the predetermined threshold value (NO in step S36), the scheduling unit 27 reserves the band of the mobile station to the overall region including the edge part of the schedule target zone in the frequency direction (step S40). As a result, the band of a mobile station having a lower variation value within the frequency band, i.e., a mobile station with a smaller variation in the propagation channel in the frequency direction, is scheduled to the edge part of the schedule target zone in the frequency direction at a higher priority.

Steps S32-S40 are successively executed on each zone with the adjacent subcarrier allocation applied thereto. When the scheduling process is complete, the downlink communication regarding the schedule results starts (step S42).

In accordance with the scheduling method of the radio communication system of the embodiment, the band of the mobile station with a smaller variation of the propagation channel in the frequency direction is scheduled to the edge part in the frequency direction at a higher priority, and the band of the mobile station with a larger variation of the propagation channel in the frequency direction is scheduled to the region excluding the edge part in the frequency direction. The mobile station with the large variation of the propagation channel in the frequency direction is not scheduled to the edge part in the frequency direction which is subject to a decrease in the channel estimation accuracy. A decrease in the channel estimation accuracy of the mobile station with the large variation in the propagation channel in the frequency direction may thus be avoided. The communication throughput of the plurality of mobile stations scheduled to all the zones may be increased.

Certain embodiments of the present invention have been discussed. The above-described embodiments may be used in combination. The reference signal serving as a reference for estimating the movement speed of the mobile station or the variation value within the frequency band is the pilot signal in the above discussion.

Alternatively, another known signal such as a sounding signal may serve as a reference signal.

Figure 11:
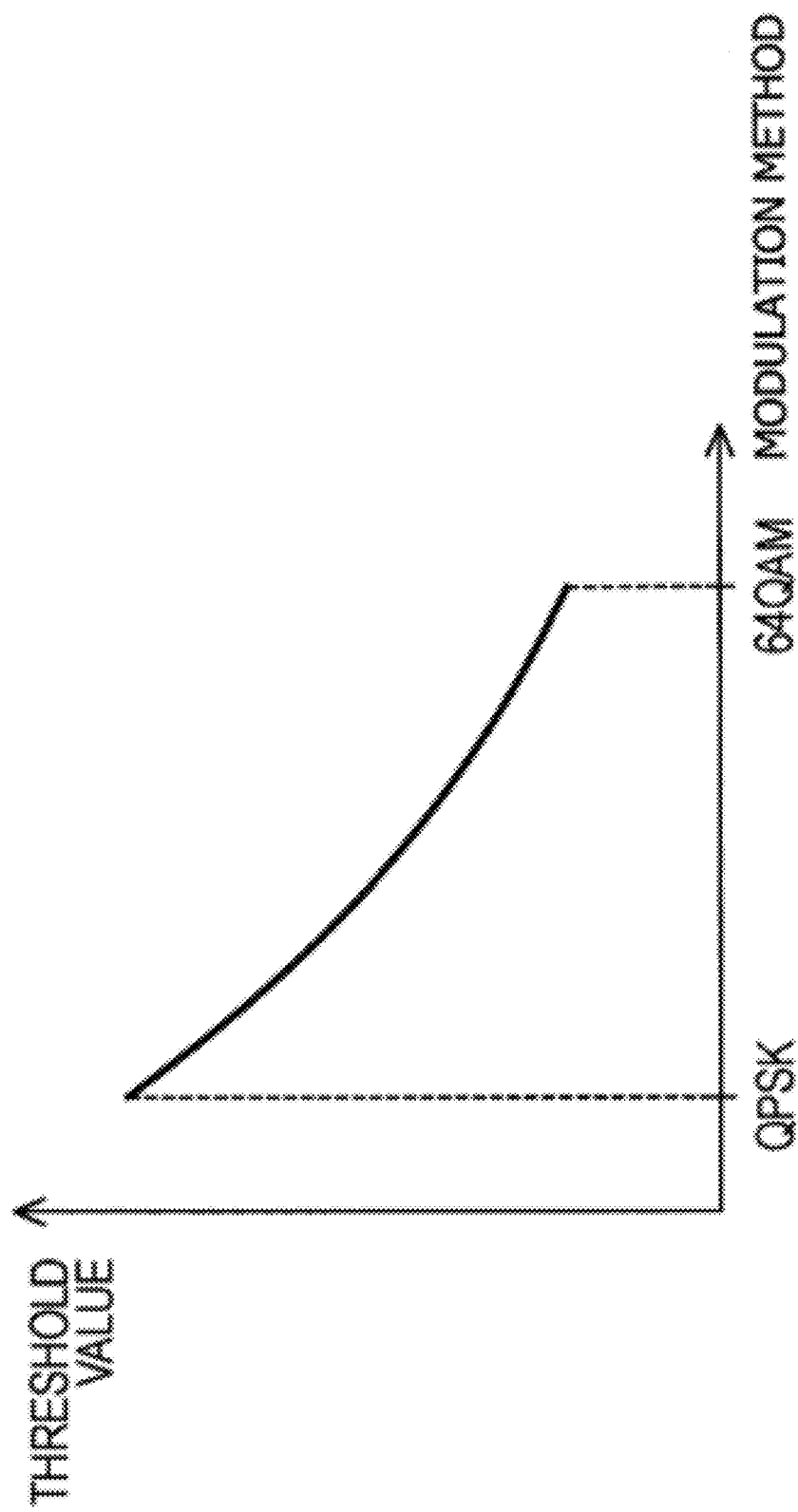
FIG. 11 illustrates a relationship of a modulation encoding method, a movement speed and a determination threshold value to a variation value in a frequency band in a radio communication system according to an embodiment.
Figure 12:
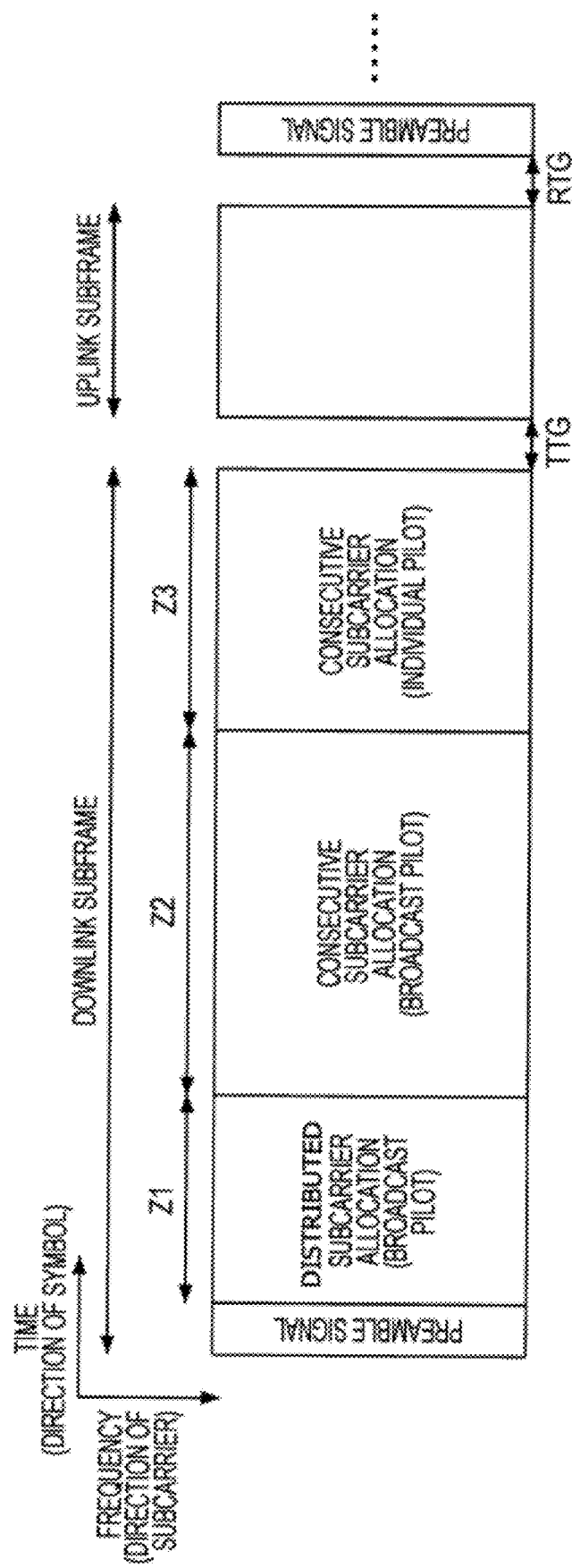
FIG. 12 illustrates an example of a transmission frame structure.
Figure 13:
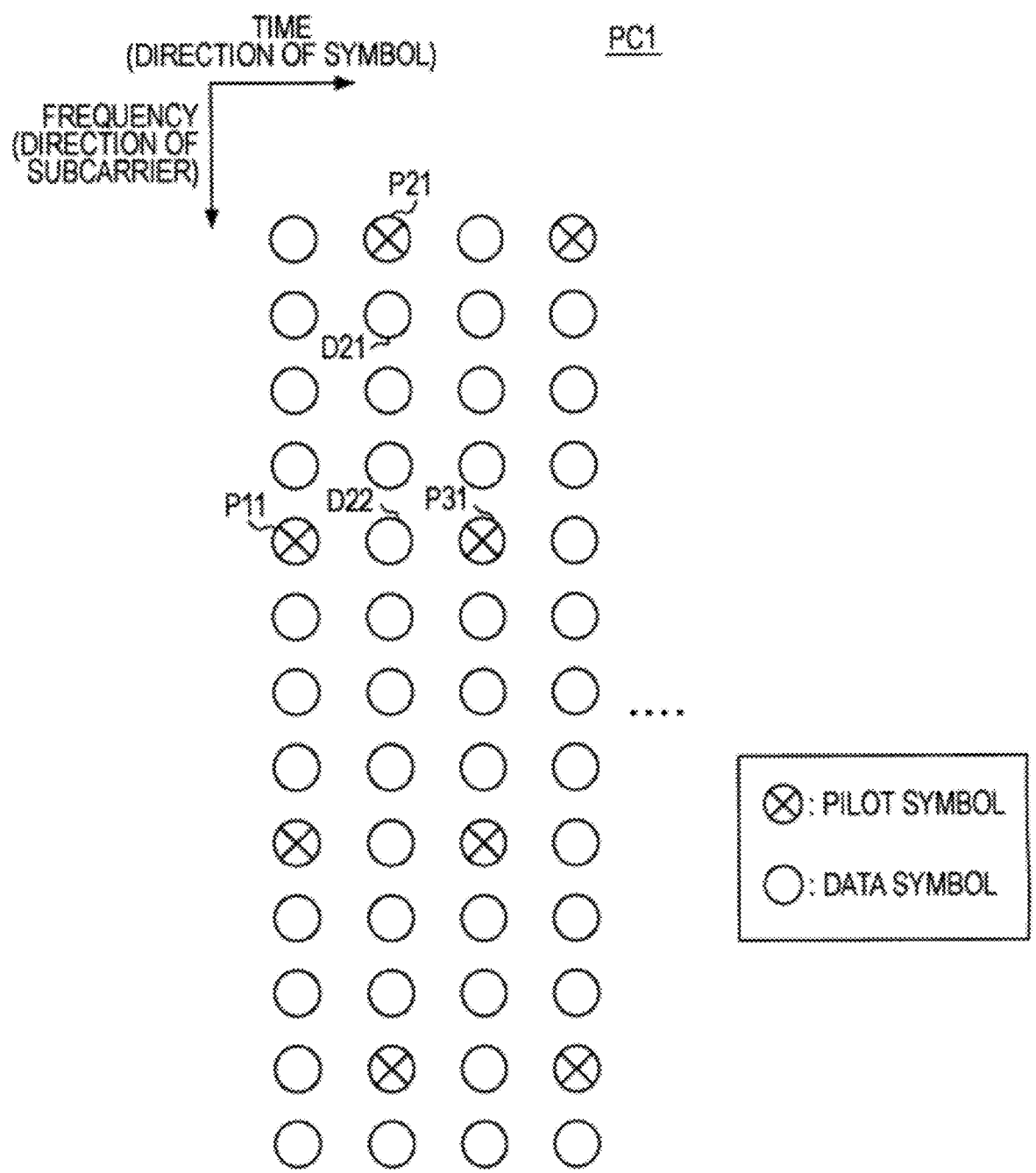
FIG. 13 illustrates an example of a pilot transmission method.
Figure 14:
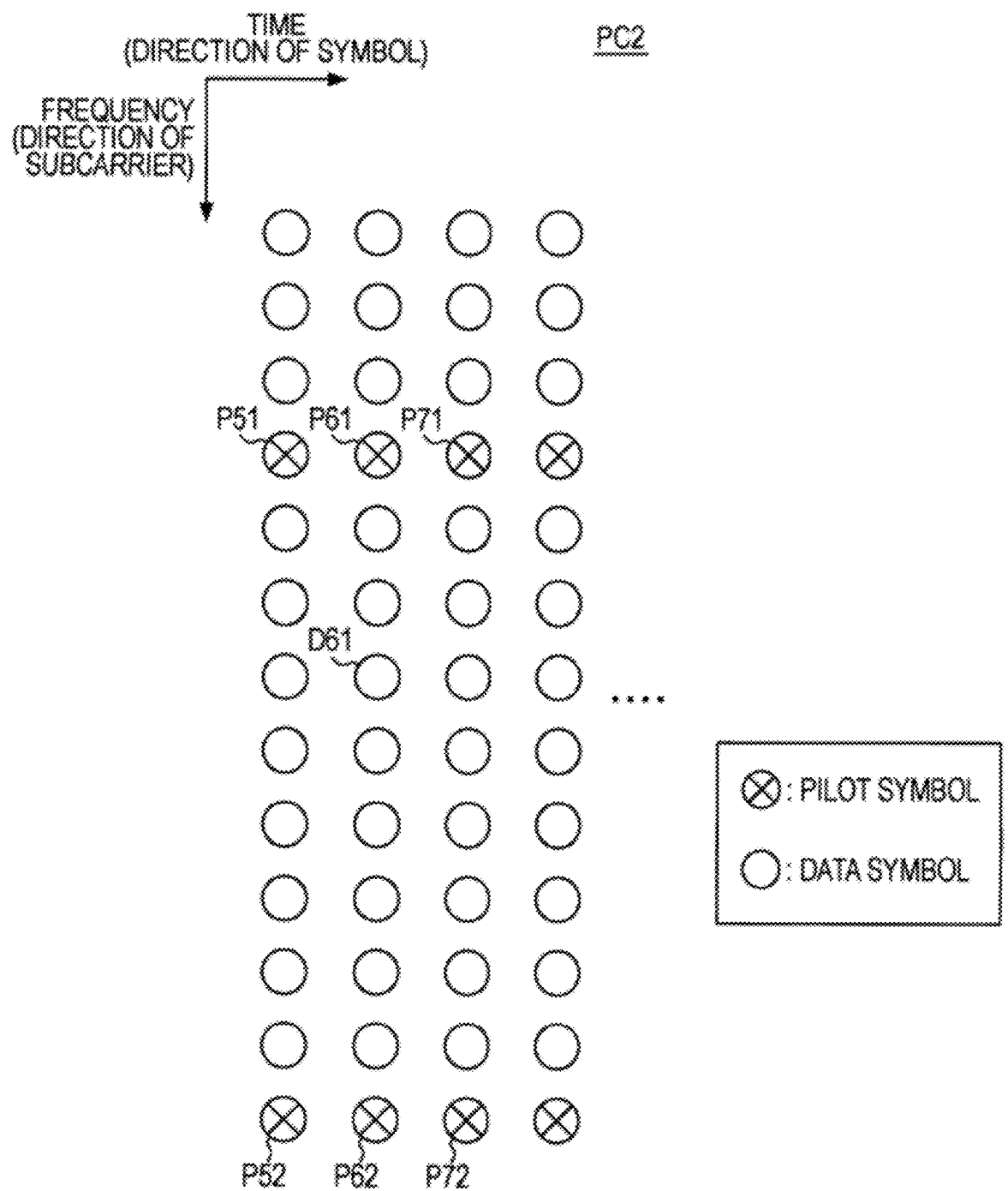
FIG. 14 illustrates an example of a pilot transmission method.
Figure 15:
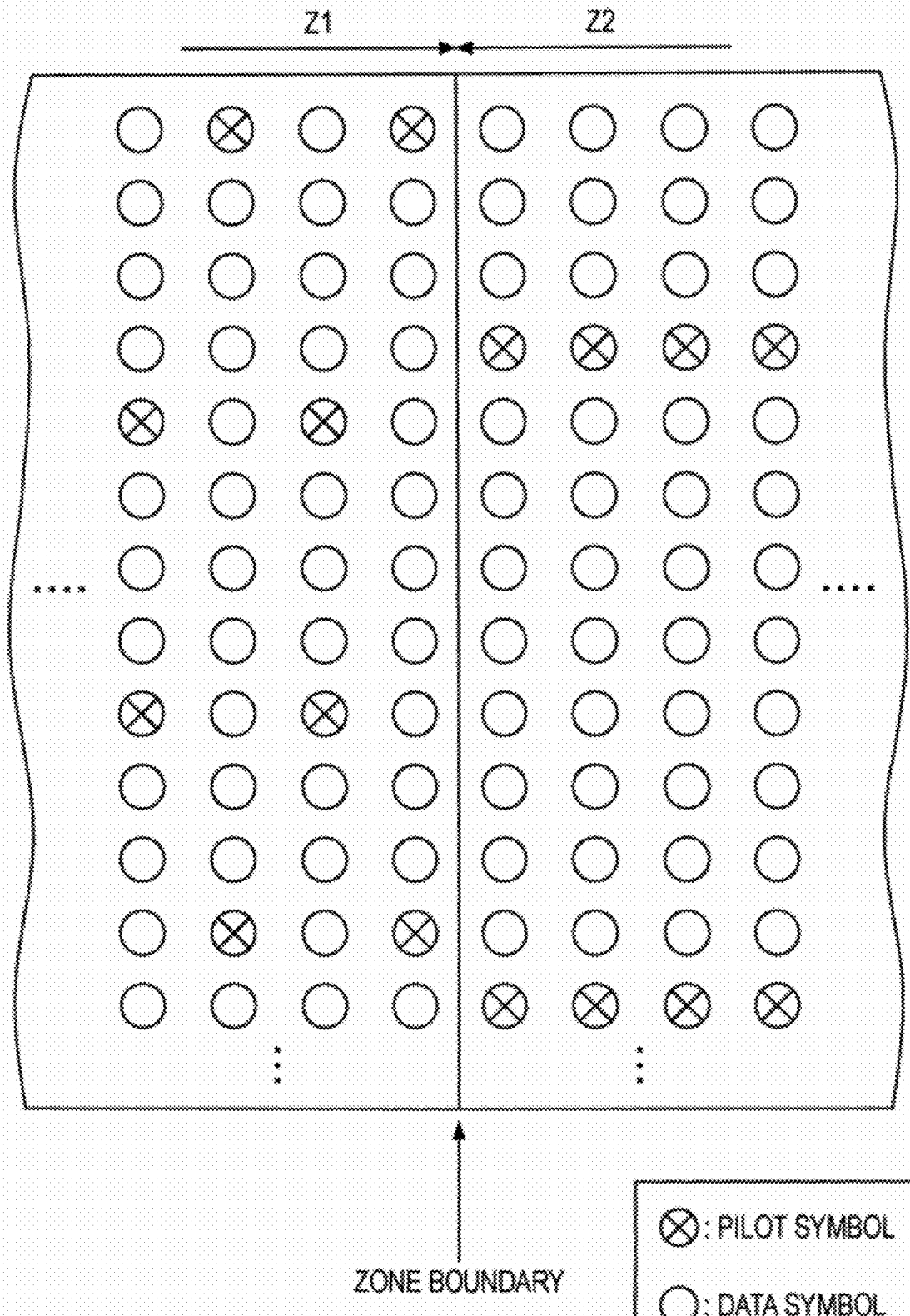
FIG. 15 illustrates an example of a pilot allocation around the boundary of a zone.
Figure 16:
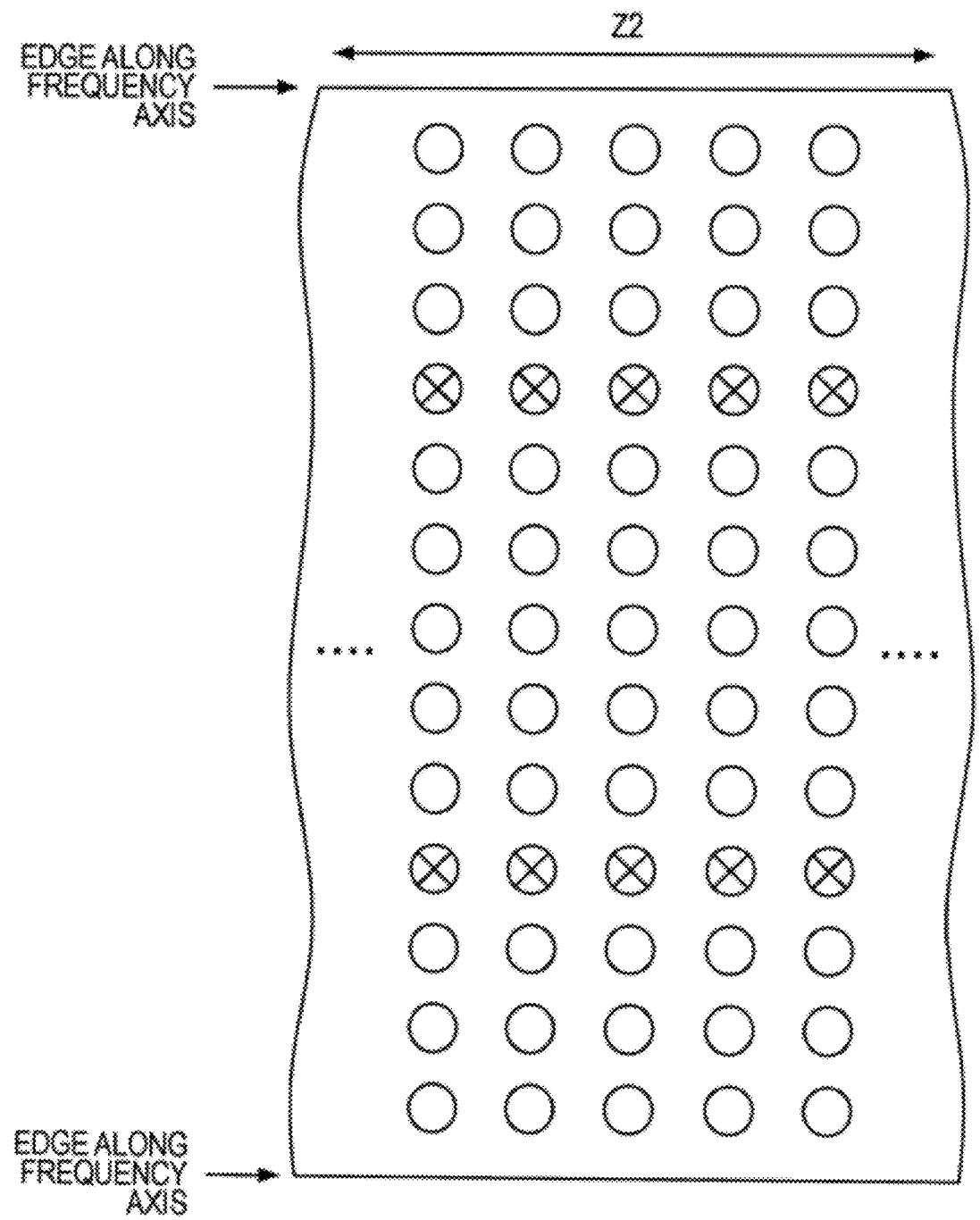
FIG. 16 illustrates an example of a pilot allocation edge part of a zone in a frequency direction.

In each of the above-described embodiments, the threshold value for the determination of the movement speed of the mobile station and the variation value within the frequency band is fixed. Alternatively, the threshold value may be variable depending on the modulation encoding rate. As illustrated in FIG. 11, as the transmission efficiency of the modulation encoding method is higher, the threshold value for each of the determination of the movement speed of the mobile station and the variation value within the frequency band is preferably lower. More specifically, if the transmission efficiency of the modulation encoding method for use in the communication with the mobile station is higher (such as 64 QAM modulation), a decrease in the BER of received data caused in response to a decrease in the channel estimation accuracy at the mobile station increases further. The threshold value of the mobile station is set to be low so that the scheduling of the mobile station to the zone boundary or the frequency edge part becomes difficult.

Certain embodiments control a decrease in the channel estimation accuracy caused by the pilot in the region where continuity in the pilot allocation or the pilot directivity in the frame is lost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio base station for allocating to a mobile station a radio resource in a time direction and a frequency direction of a frame to perform radio communications with the mobile station, the radio base station comprising:
   a zone forming unit configured to apply to a plurality of zones, into which the frame is partitioned in the time direction, one of pilot transmission methods different in terms of a pilot allocation or a pilot directivity; and
   in an allocation of transmission data to a plurality of mobile stations in a first zone adjacent to a second zone with a pilot transmission method different from the pilot transmission method of the first zone applied to the second zone, a scheduler configured to schedule a first mobile station moving at a low speed from among the plurality of mobile stations to a vicinity of a boundary with the second zone at a higher priority than a second mobile station moving at a high speed.

2. The radio base station according to claim 1, wherein a movement speed of the mobile station is estimated by detecting a variation in a propagation channel response of a reference signal transmitted from the mobile station.

3. The radio base station according to claim 1, wherein a signal related to a movement speed of the mobile station is received from the mobile station.

4. The radio base station according to claim 1, wherein as a transmission efficiency of a modulation encoding method used in communications with the mobile station is higher, a threshold value applied to a determination of a movement speed of the mobile station is set to be lower.

5. A radio base station for allocating to a mobile station a radio resource in a time direction and a frequency direction of a frame to perform radio communications with the mobile station, the radio base station comprising:
   a zone forming unit configured to apply to a plurality of zones, into which the frame is partitioned in the time direction, one of pilot transmission methods different in terms of a pilot allocation or a pilot directivity;
   an estimating unit configured to estimate a variation value of a propagation channel in the frequency direction for each of a plurality of mobile stations; and
   in the allocation of a band to the plurality of mobile stations in a first zone, a scheduler configured to schedule a first mobile station to an edge part of the frame in the frequency direction at a higher priority than a second mobile station, the second mobile station from among the plurality of mobile stations being higher in variation value of the propagation channel than the first mobile station.

6. The radio base station according to claim 5, wherein the variation value of the mobile station is estimated by detecting a variation in a propagation channel response of a reference signal transmitted from the mobile station in the frequency direction.

7. The radio base station according to claim 5, wherein the variation value of the mobile station is estimated by detecting a delay spread of a signal transmitted from the mobile station.

8. The radio base station according to claim 5, wherein as a transmission efficiency of a modulation encoding method used in communications with the mobile station is higher, a threshold value applied to a determination of the variation value is set to be lower.

9. A radio resource allocation method of a base station for allocating to a mobile station a radio resource in a time direction and a frequency direction of a frame to perform radio communications with the mobile station, the radio resource allocation method comprising:
   applying to a plurality of zones, into which the frame is partitioned in the time direction, one of pilot transmission methods different in terms of a pilot allocation or a pilot directivity;
   acquiring a movement speed of the mobile station by detecting a power variation in a reference signal transmitted from the mobile station or by receiving a signal related to a movement speed of the mobile station from the mobile station; and
   if transmission data is allocated to a plurality of mobile stations in a first zone adjacent to a second zone with a pilot transmission method different from the pilot transmission method of the first zone applied to the second zone, scheduling a first mobile station moving at a low speed from among a plurality of mobile stations to a vicinity of a boundary with the second zone at a higher priority than a second mobile station moving at a high speed.

10. A radio communication system comprising a mobile station, and a radio base station allocating to the mobile station a radio resource in a time direction and a frequency direction of a frame to perform radio communications with the mobile station, the radio communication system comprising:
   the radio base station including:
   a zone forming unit configured to apply to a plurality of zones, into which the frame is partitioned in the time direction, one of pilot transmission methods different in terms of a pilot allocation or a pilot directivity; and
   in an allocation of transmission data to a plurality of mobile stations in a first zone adjacent to a second zone with a pilot transmission method different from the pilot transmission method of the first zone applied to the second zone, a scheduler configured to schedule a first mobile station moving at a low speed from among the plurality of mobile stations to a vicinity of a boundary with the second zone at a higher priority than a second mobile station moving at a high speed.

11. A radio resource allocation method of a radio base station allocating to a mobile station a radio resource in a time direction and a frequency direction of a frame to perform radio communications with the mobile station, the radio resource allocation method comprising:
   applying to a plurality of zones, into which the frame is partitioned in the time direction, pilot transmission methods, the pilot transmission methods different in terms of a pilot allocation or a pilot directivity;
   acquiring a variation value of the propagation channel in the frequency direction for a first mobile station; and
   scheduling the first mobile station to an edge part of the frame in the frequency direction at a higher priority than a second mobile station, the second mobile station having a variation value of the propagation channel higher than the first mobile station.
   applying to a plurality of zones, into which the frame is partitioned in the time direction, pilot transmission methods, the pilot transmission methods different in terms of a pilot allocation or a pilot directivity;
   acquiring a variation value of the propagation channel in the frequency direction for a first mobile station; and
   scheduling the first mobile station to an edge part of the frame in the frequency direction at a higher priority than a second mobile station, the second mobile station having a variation value of the propagation channel higher than the first mobile station.

12. The radio resource allocation method according to claim 11, wherein the acquiring a propagation channel value includes acquiring a propagation channel value for each of a plurality of mobile stations, the first and second mobile stations being a part of the plurality of mobile stations.

13. A radio communication system including a mobile station, and a radio base station allocating to the mobile station a radio resource in a time direction and a frequency direction of a frame to perform radio communications with the mobile station, the radio communication system comprising:

a zone forming unit configured to apply to a plurality of zones, into which the frame is partitioned in the time direction, pilot transmission methods, the pilot transmission methods different in terms of a pilot allocation or a pilot directivity;

an estimating unit configured to estimate a variation value of a propagation channel in the frequency direction for a first mobile station; and a scheduler configured to schedule the first mobile station to an edge part of the frame in the frequency direction at a higher priority than a second mobile station, the second mobile station with a higher variation value of the propagation channel than the first mobile station.

14. The radio communication system according to claim 13, wherein the estimating unit is configured to estimate a variation value of a propagation channel in the frequency direction for a plurality of mobile stations, the scheduler schedules to allocate a band to the plurality of mobile stations in a first zone, and the first and second mobile stations are a part of the plurality of mobile stations.

* * * * *